G. R. Clarke,
Elevator.
Nº 78,645.         Patented June 9, 1868.
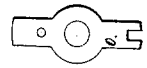
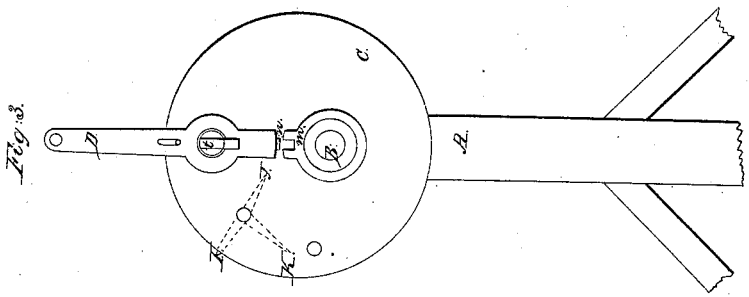
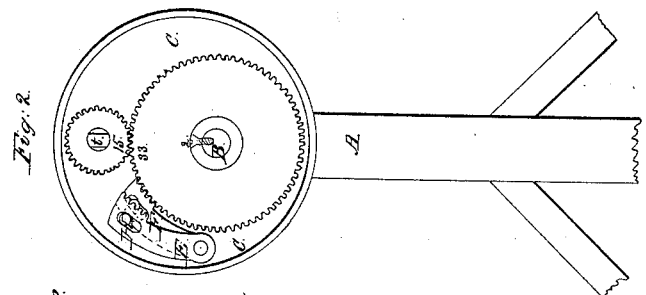
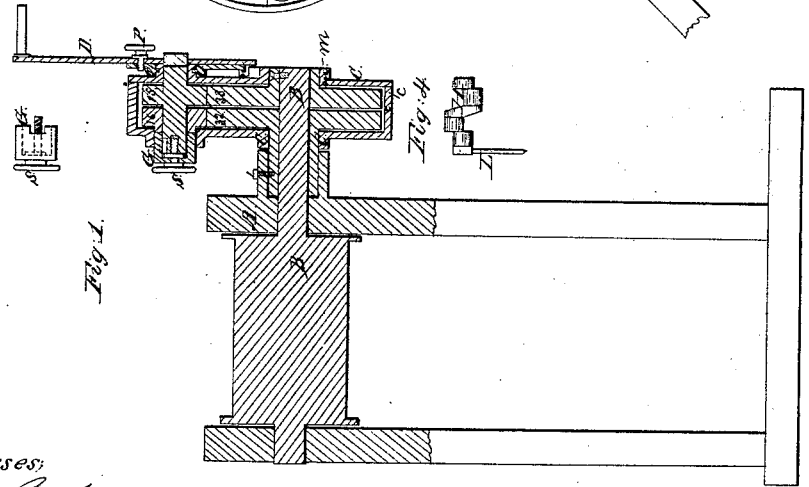
Witnesses:
Wm H Nixon
Peter DeLacy
Inventor:
Geo. R. Clarke

United States Patent Office.

GEORGE R. CLARKE, OF NEW YORK, N. Y.

Letters Patent No. 78,645, dated June 9, 1868.

---

IMPROVEMENT IN HOISTING-MACHINE.

---

The Schedule referred to in these Letters Patent and making part of the same.

---

TO ALL WHOM IT MAY CONCERN:

Be it known that I, GEORGE R. CLARKE, of the city, county, and State of New York, have invented a new, and improved Hoisting-Machine, which is clearly and fully described as follows:

Figure 1, of the accompanying drawings, is a side view of a vertical section through the centre.

Figure 2 is an end view with the end casing removed.

Figure 3 is an end view with the casing.

Like letters and numerals refer to like parts in each figure.

A represents the frame; B represents the roller; C, the casing in which the gearings are enclosed; D is the crank; E and F are dogs, (see fig. 2,) by which gear-wheels 32 and 33 are clutched, when desired.

16 and 15 are pinion-wheels, which mesh into 32 and 33. These numerals indicate the number of cogs in each wheel.

G is a clutch, operated by screw S, by which 16 and 15 are made fast together, when desired.

H is a shipper-apparatus, shaped as shown in Figure 4, the end of which is seen in fig. 2, by which dogs E and F are made to clutch wheels 32 and 33, when desired.

When lever L, which is attached to H, is made to point to I, (see fig. 3,) 32 is clutched, when L points to J, 33 is clutched, when L points to K, neither one is clutched.

M, (fig. 3,) is a projection of the case C, and is a kind of hub, in which there is a niche, into which a dove-tail-like fulcrum, n, fits, which projects from the inner side at the inner end of the crank D.

Fig. 3 shows two slots in the crank lengthwise, also a circular opening, in which the shaft of the pinions 16 and 15 may revolve, when desired. These slots enable the crank to be shipped when it is desired to connect or disconnect the crank with M.

The inner slot also admits the tenon t, which is on the end of the shaft of pinions 16 and 15, to enter, and thus prevents the revolution of the shaft on its own axis, when it is so desired.

Immediately behind crank D is an irregular-shaped collar, O, (Figure 5,) which is permanently attached to a hub-like projection of C in such a manner as to be free to revolve upon this hub-like projection, when desired.

In one end of collar O is a niche, the same as in m, to receive the fulcrum n, while the other end of O receives the screw P, (see fig. 1,) by which the crank D is held in proper relation to O.

Now, then, wheel 32 being fast to frame A by screw 1, it is at all times immovable, and 33 being fast to roller B by screw 2, 33 and B must always move together as one.

When 33 is clutched by dog E, and crank D is connected with m by fulcrum n, then the crank d, casing C, and roller B all revolve together, being a simple crank-and-windlass motion.

When 33 is not clutched, and 32 is clutched, and pinion 16 is free, and the shaft of pinion 15 is embraced by the slot in crank D, and fulcrum m is freed from n, then the revolution of D is two to one of B.

But when 32 and 33 are not clutched, and 16 and 15 are clutched by G and freed from D, and D is clutched to m, then the crank, D, and case C revolve together, making eleven revolutions to one of B.

Again, if crank D is freed from m, and made to revolve, 16 and 15 are free to revolve together around wheels 32 and 33, pinion 16 will have made two complete revolutions around 32, pinion 15 (being clutched to 16) will have made the same revolutions and have travelled the same distance, but will have lacked three cogs of having travelled once around 33.

Hence, when 16 has made two complete revolutions, and carried 15 with it, to the same point of starting, it follows that 33, with B, has advanced three cogs, in order to permit 15 to arrive at the point of starting in company with 16.

Thus, in this case and arrangement, we find that roller B, with wheel 33, has advanced three thirty-thirds of one revolution during one revolution of the case C, and two revolutions of pinions 16 and 15, and for three revolutions of crank D. Hence it requires, with this last-described arrangement, eleven revolutions of the case C, twenty-two revolutions of pinions 16 and 15, and thirty-three revolutions of crank D to make one revolution of roller B.

Crank D is compelled to make thirty-three revolutions in consequence of 16 and 15 having made twenty-two revolutions each, on their own axis, and eleven revolutions around the axes of their primaries 32 and 33.

It is not essential that pinions 16 and 15 should have a diverse number of cogs, nor is it essential that wheels 32 and 33 should have a like diversity of cogs, as herein described.

The same mode of obtaining power and motion, as herein set forth, is eminently adapted to steering vessels, to capstans, and to all presses requiring great power, such as hay and cotton-presses.

What I claim Letters Patent for of the United States, is—

Primary wheels 32 and 33, pinion-wheels 16 and 15, in combination with revolving case C.

Also, revolving case C, crank D, and collar O, when constructed, arranged, and operated substantially as herein set forth.

GEO. R. CLARKE.

Witnesses:
WM. H. BISHOP,
PETER DE LACY.